United States Patent [19]

Wilkes

[11] Patent Number: 4,567,789
[45] Date of Patent: Feb. 4, 1986

[54] METHOD AND APPARATUS FOR CHANGING SPEED USING A DIFFERENTIAL BAND

[76] Inventor: Donald F. Wilkes, 2816 Charleston, NE., Alburquerque, N. Mex. 87110

[21] Appl. No.: 521,398

[22] Filed: Aug. 8, 1983

[51] Int. Cl.$^4$ .......................... F16H 15/50; F16H 9/12
[52] U.S. Cl. ........................................ 74/796; 74/689; 74/190; 474/41
[58] Field of Search ................. 74/785, 793, 192, 191, 74/193, 689, 750 R, 772, 796, 798, 801, 190, 194, 805, 640; 474/39, 41

[56] References Cited

U.S. PATENT DOCUMENTS

| | | | |
|---|---|---|---|
| 2,792,712 | 5/1957 | Gibson | 474/39 |
| 2,870,641 | 1/1959 | Bellmann | 474/41 |
| 2,890,592 | 6/1959 | Keepers | 474/41 |
| 2,941,421 | 6/1960 | Plotti | 74/793 |
| 3,148,560 | 9/1964 | Woodward | 74/640 |
| 3,491,608 | 1/1970 | Trofimov | 474/39 |
| 3,670,579 | 6/1972 | Wilkes | 74/640 |

*Primary Examiner*—Leslie A. Braun
*Assistant Examiner*—David A. Novais
*Attorney, Agent, or Firm*—Burns, Doane, Swecker & Mathis

[57] ABSTRACT

A transmission using an endless metal band provides an infinitely variable output velocity for an essentially constant input velocity. The transmission can be controlled to give both forward and reverse directions, through zero output speed. A multi-layer band can be used for greater torque transmission.

18 Claims, 7 Drawing Figures

METHOD AND APPARATUS FOR CHANGING SPEED USING A DIFFERENTIAL BAND

BACKGROUND OF THE INVENTION

The present invention relates generally to methods and apparatus for changing an input speed to an output speed. More particularly, the present invention relates to a method and apparatus for providing an infinitely variable output speed from a generally constant input speed.

Speed changing devices are employed in many types of equipment. In a simple transmission, for example, devices are often provided to give one or more discrete output speeds in relation to an input speed. In other equipment, it is necessary to have a wider variety of output speeds available. In such other equipment, the output speed often needs to vary continuously, or infinitely, over the desired speed range while only a constant speed is available as input.

One of the more common variable speed changing devices employs a fixed length V-belt and a pair of cooperating pulleys. The pulleys may have the ability to adjust the V diameter on which the belt operates in order to obtain a variable output speed. Typically, one such adjustable pulley mechanism is driven while another adjustable pulley mechanism is spring-loaded to maintain tension on the V-belt and to make the second adjustable pulley mechanism responsive to changes made in the first driven adjustable pulley mechanism.

A somewhat analogous speed changing device employs a variable V-drive in combination with another traction driven fixed-width drum. Sometimes a plurality of these drums are employed to increase the maximum power transmission capability. These devices occasionally use elements packaged in planetary movement arrangements with one device at the center and a multiplicity of encircling meshing elements having planetary movements.

Another class of variable speed drives can be characterized as the ball and disc type. In this class of drive mechanisms, the rotational axis for a ball element is usually at a substantially right angle to the rotational axis of a disc element. The ball element which has a surface of revolution is positioned so that when it is pressed against the rotating disc element, the ball element is driven by the disc. By moving the ball element along a radius of the disc element, a variable speed drive can be obtained from the ball element.

Another class of speed regulation employs purely inertial devices. Flywheel governors are common examples of inertial devices that have been used to control internal combustion engine speed under varying load conditions for many years.

Each of the various infinitely adjustable speed changing devices currently available have various problems and limitations. One common problem is the presence of residual slippage between traction elements. Such slippage is undesirable since it wastes energy, generates heat, promotes wear, and increases working clearances.

Another common problem is that many of the materials commonly used to fabricate components of variable speed devices are subject to rapid wear. As a result, the devices experience increased clearances with attendant noise, slippage and reduced efficiency. Wear also tends to create objectionable dirt and particles resulting from degradation of the materials.

Many of the available speed changing devices also exhibit poor power transmission capability for the spatial volume which they occupy. That is, a large and usually heavy transmission is needed to transmit modest power levels. As a result, to transmit large amounts of power, a physically large transmission is required, adding to the weight of the device.

Many of the available speed changing devices also fail to provide the ability to reverse the direction of output rotation while the input operates at a uniform speed in a constant direction. This capacity can be desirable for example in motorized vehicles where a constant speed input could be varied so as to provide both forward and reverse drive speeds.

Generally, the design characteristics of the known variable speed transmissions do not permit the rate of speed variation to be controlled in the design process. Without the ability to regulate speed change variations during the design, the response of the transmission to a control input cannot be selected by the designer to meet his specific design problem.

Most known transmission systems are also critically dependent upon lubrication, cleanliness or transmission fluids in order to provide and maintain their speed change capability. In many desirable applications of variable speed transmissions, it is extremely difficult, if not impossible, to lubricate or maintain cleanliness.

Another deficiency of most known speed change devices is the necessity for a clutch to permit the output speed or angular velocity to go to zero (i.e. stop) while the power supply is still operating. Clutches clearly introduce additional complexity into a system as well as expense, bulk and weight. In a similar vein, must known devices which do permit a zero output speed lack sufficient traction at that speed to be useful. Traction near zero is necessary in order to create useful starting movement without slippage in the transmission device.

Still further, most known devices are unable to run at the maximum speeds that could be advantageous for many applications. This inability to run at high speed is often a result of the fact that locally generated heat can devulcanize rubber, soften heat-treated materials, generate noise, and cause vibrations as well as other undesirable effects.

The control of known variable speed devices has also been a problem. More particularly, most devices do not have a sufficiently sensitive control that can give small changes in the output speed settings. In many useful applications for variable speed devices, such sensitivity to small changes in response are highly desirable.

From the foregoing, it will be clear that the need continues to exist for a speed changing device which overcomes problems of the type discussed.

OBJECTS AND SUMMARY OF THE INVENTION

It is therefore a general object of the invention to provide a method and apparatus for changing speed which overcomes the problems of the type noted above. Moreover, it is an object of the present invention to provide an infinitely variable speed changing device in which the output angular velocity is infinitely variable through zero and into reverse. It is another object of the present invention to provide a method and apparatus for changing speed which is not dependent upon large forces that are not self-reacting or on small zones of tractive drive.

It is an object of the present invention to provide a method and apparatus for changing speed which is not subject to significant degrees of swirling, sliding or creeping in the zone of tractive effort. It is a further object of the present invention to provide a method and apparatus for changing speed in which the primary torque conversion mechanism is virtually immune to physical wear, and Coulomb friction.

It is another object of the present invention to provide a method and apparatus for changing speed in which the primary torque conversion mechanism does not require lubrication of any type. Yet another object of the present invention is to provide a method and apparatus for changing speed which is inherently self-reacting and which is balanced.

Still another object of the present invention is to provide a method and apparatus for changing speed which is amenable to efficient packaging within a right circular cylindrical envelope having a thickness between one-fifth and one-half of its diameter.

Yet still another object of the present invention is to provide a method and apparatus for changing speed in which the primary mechanism is subject to slow progressive hunting movements to distribute surface contact stress points and employ progressively varying asperity matching relationships to achieve dependable traction which is not subject to degradation in response to wear.

Yet another object of the present invention is to provide a device in which the maximum rate of change of output speed is controlled by the design and is inherently incapable of abrupt step function type changes in the ratio of input speed to output speed. It is another object of the present invention to provide a method and apparatus for changing speed which are capable of operating over very high speeds as well as very low speeds.

The foregoing objects in accordance with the present invention are obtained by providing a generally cylindrical rotationally fixed envelope having a predetermined circumferential length within which an endless metal band is confined. The endless metal band has a length which exceeds the predetermined circumferential length such that the band defines a circularly arcuate portion engaging the envelope, a lobe and a reflexively curved portion. An input means is provided which operates at a substantially constant input angular velocity and which is operable to move the lobe circumferentially around the envelope. The portion of the band in lobe moves at least radially with respect to the envelope. In addition, an output means is provided which is driven by the moving lobe to provide the output angular velocity or speed. A device is provided to adjust the predetermined circumferential length of the envelope so that circumferential displacement of a point on the band with respect to the envelope during each revolution of the load can be infinitely controlled in order to change the output speed.

To provide an ability to control the rate of speed change in the design process, the envelope may include a pair of frustoconical surfaces which converge in the radially outward direction and which engage edges of the endless band. In this manner, the rate of change of speed can be determined by the designer during the conceptual stages of a design by selection of the conical angle for the frustoconical surfaces. Moreover, since the frustoconical surfaces engage the edges of the band, the edges are self-shaping due to pressure and wear of those surfaces and wear of the band edges is automatically compensated. Furthermore, since the band frictionally engages those frustoconical surfaces but does not slide with respect to those surfaces, lubrication is not necessary.

In order to ensure that the reflexively curved portion of the band is not pressed against the constraining envelope during operation of the speed change device, a centrally disposed roller is provided around which the reflexively curved portion is looped.

To ensure that forces are radially balanced on the roller and on the band, a pair of orbiting rollers are provided which engage the surface of the band as it loops around the centrally disposed roller.

The pair of rollers are caused to orbit about the centrally disposed roller by the input device which may include a pair of diametrically opposed shafts mounted so as to orbit about the center of the device. The band causes the orbiting rollers to rotate about their respective shafts as each point on the band is picked up radially and laid down on the envelope in a circumferentially spaced position.

The output speed may be obtained by providing each of the orbiting rollers with a spur gear which engages an internal ring gear carried by the output shaft.

Variable speed control is obtained by providing a means for adjusting the axial spacing between the frustoconical surfaces. As this axial spacing is adjusted, the circumferential length of the confining envelope can be varied radially inwardly or radially outwardly.

For applications where greater torque transmission capability is desired and for applications where protection against breakage of a single band, a plurality of nested bands may be used. This effectively stiffens the band so that greater torque can be transmitted and simultaneously gives protection if one of the bands fails.

BRIEF DESCRIPTION OF THE DRAWINGS

The above as well as many other objects and advantages of the present invention will be apparent to those skilled in the art when the specification is read in conjunction with the drawings wherein like reference numerals have been applied to like elements and wherein.

DESCRIPTION OF THE PREFERRED EMBODIMENT

Figure 1:
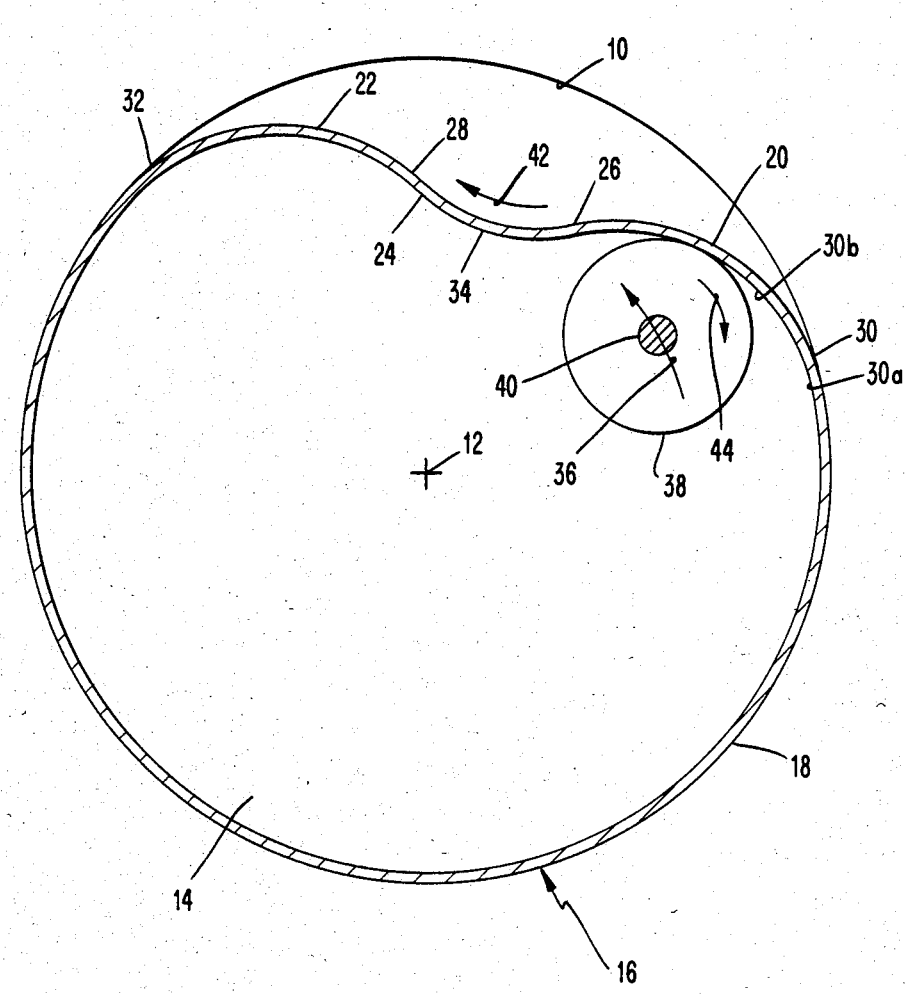
FIG. 1 is a schematic illustration of the differential band concept used in the method and apparatus of the present invention.

An appreciation of the fundamental principles involved in the speed changing device of the present invention is facilitated by consideration of a simple schematic model (see FIG. 1). In the simple model, a circularly cylindrical envelope 10 is provided which is spatially fixed and which does not rotate. The envelope 10 has a central axis 12 and a predetermined circumferential length. The envelope 10 defines a cavity 14 within which a thin, flexible band 16 is disposed. Preferably, the band 16 is fabricated from metal, but may be fabricated from other suitable materials. The band can have any desired width measured in a direction parallel to the axis 12 (i.e., perpendicular to the plane of FIG. 1) and has a thickness which is small in comparison to its diameter. More particularly, the thickness of the band 16 is preferably less than one-fifth the width of the band and can be as small as possible while maintaining uniformity in the thickness of the band.

Uniformity in band thickness is particularly important in devices of the type discussed herein. More particularly, each point on the band, as will be seen, is subjected to cyclic bending stress which occur in a very large number of cycles. Since the stiffness against bending in the band is directly proportional to the cube of the band thickness, it will be seen that uniformity in band thickness is important to maintain uniform behavior of the band throughout its length.

The band 16 has a length measured along its perimeter which exceeds the circumferential length of the envelope 10. With such a relationship between the length of the band 16 and the circumferential length of the envelope 10, the band 16 assumes a configuration having a circularly arcuate portion 18 which conforms to and is in engagement with the envelope 10. In addition, the band 16 includes two lobes 20, 22, each of which is radially displaced inwardly from the envelope 10 and both of which are connected by a reflexively curved portion 24 of the band. The reflexively curved portion 24 extends between two inflection points 26, 28 where the direction of bending in the band 16 reverses itself. Each of the lobes 20, 22 extends from a corresponding point of tangency 30, 32 where the band is tangent to the circular envelope 10 to the corresponding inflection point 26, 28. And the arcuate portion 18 extends between the two inflection points 30, 32.

It will be readily appreciated that if a disturbing force is applied to one of the lobes 20, 22 or to the reflexively curved portion 24 at a point other than the point 34 (where the band 16 is radically displaced from the envelope 10 by the maximum distance), the lobes and reflexively curved portion will move circumferentially around the envelope 10 in order to accommodate the disturbing force.

During such movement of the lobes 20, 22 and the reflexively curved portion 24, for example, in response to a perturbing force in the direction of the arrow 36, each incremental element of the band length is lifted radially from the envelope 10 at the point of tangency 32, moves radially inwardly, passes through the reflexively curved portion 24 and eventually comes into engagement with the envelope 10 at the other point of tangency 30.

Accordingly, it can be seen that, if a disturbing force is applied to the lobe 20 as, for example, by a roller 38 carried by a shaft 40 and if that disturbing force is caused to complete one complete revolution around the axis 12 of the envelope 10, then a point 30a, which was initially in contact with the point of tangency 30, will be circumferentially displaced to the position 30b when the orbit of the roller 38 has been completed. The distance between the points 30a and 30b corresponds to the difference in length between the differential band 16 and the circumferential length of the envelope 10.

It will, moreover, be appreciated by those skilled in the art that the instantaneous velocity of any incremental length of the band 16 on the lobes 20, 22 and the reflexively curved portion 24 varies both in magnitude and direction. Initially, as the band lifts from the envelope 10, each element of the band has a velocity which is directed radially inwardly toward the center 12. Subsequently, as the band moves through the reflexively curved portion 34, the band element has a substantially circumferential velocity. Finally, as the band moves toward the point of tangency 32, its velocity component is again substantially radial and directed radially outwardly away from the center 12 and toward the envelope 10.

It will be observed that the movement of an element on the band between the points of tangency 30, 32 is generally in the direction from the point of tangency 30 toward the point of tangency 32 in the circumferential direction. The direction of movement of an element is illustrated by the arrow 42 and corresponds to the circumferential displacement of each element as the roller 38 makes an orbit around the center 12.

While the orbiting shaft 40 moves in the direction of the arrow 36, the roller 38 moves in the direction of the arrow 44. Throughout the movement of the orbiting shaft 40 about the center 12, the roller 38 is in rolling contact with the inner surface of the band 16 and rolls about the a suitable bearing provided by the shaft 40. Even though the directions of the arrow 42 and the arrow 44 suggest relative motion between the roller 38 and the band 16, the contrary fact prevails. There is purely rolling contact between the roller 38 and the band 16. The apparent dichotomy illustrated by the arrows 42, 44 is explained by the fact that shaft 40 itself is moving. Thus, the planetary motion coupled with the relative speeds between the shaft 40, the roller 38 and the band 16 combine to permit the kinematics of the system to be such that movement takes place in the directions of the arrows as illustrated with pure rolling contact with the band. In this connection, it will be noted that the instantaneous velocity of the band 16 is very slow in the portion between the point of tangencies 30, 32 which does not contact the envelope 10, especially when compared to the angular velocity of the roller 38 about the shaft 40 and the rate of angular rotation for the orbiting shaft 40 about the center 12.

The application of the principles of the invention as depicted in FIG. 1 will now be discussed in connection with the preferred embodiment of a transmission incorporating those principles.

Figure 2:
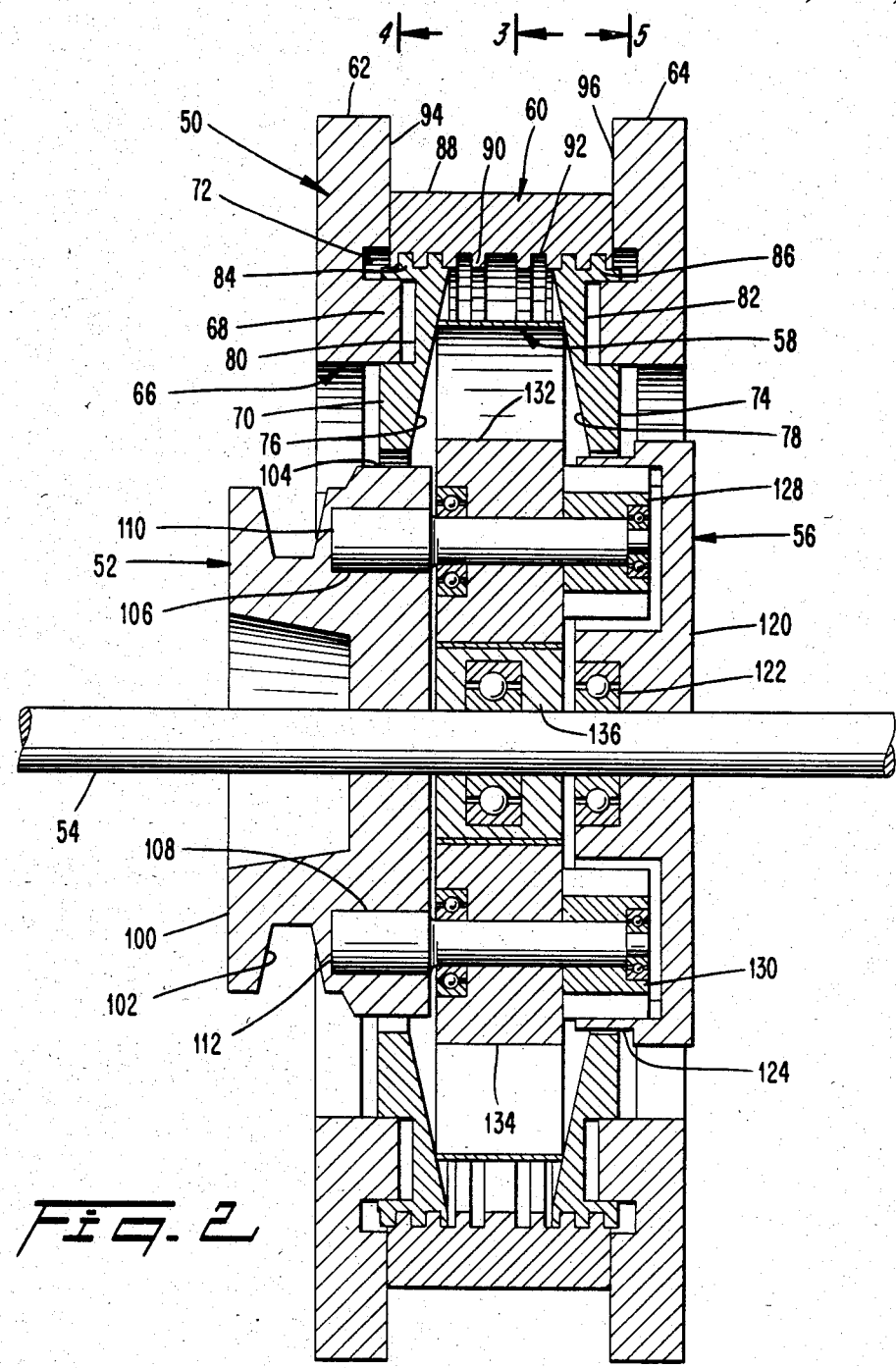
FIG. 2 is a partial cross-sectional view taken through the centerline of a transmission constructed in accordance with the present invention.

With reference to FIG. 2, a structural means 50 provides a rotationally fixed assembly for mounting the transmission or speed changing device to a related frame, vehicle or other structure (not shown). An input means 52 delivers a generally constant input angular velocity or speed to the transmission and is disposed radially inwardly of the structural means 50. The input means 52 is rotatably mounted with respect to a centrally disposed shaft 54. On the opposite side of the transmission, an output means 56 is located. This output means 56 is radially inwardly disposed with respect to the structural means 50, rotationally mounted about the central shaft 54 and displaced generally axially with respect to the input means 52. The transmission also includes an endless metal band means 58 which engages the structural means 50 in a friction locked, non-slipping fashion. In addition, the band means 58 engages portions of the output means 56 with rolling contact and is engaged by the input means 52 through portions of the output means 56. The metal band means 58 is operable by virtue of its relationship to the structural means 50, the input means 52 and the output means 56 to determine the angular velocity or speed with which the output means 56 rotates.

A control means 60 is carried by the structural means 50 and is operable to regulate diameter of the cylindrical envelope within which the metal band means 58 operates. In this fashion, the control means 60 can regulate the angular velocity of the output means 56 while a constant input angular velocity is provided to the input means 52. It will be appreciated from the following description of this preferred embodiment that it is possible to operate the transmission such that the functions of the input means 52 and the output means 56 are reversed.

The structural means 50 includes a pair of annular rings 62, 64 which are rotationally fixed and axially spaced from one another. In this preferred embodiment, the ring 64 is identical in shape and size to the ring 62, although the rings 62, 64 need not be identical. Each ring 62, 64 is preferably provided with some suitable conventional means (not shown) for attaching the rings 62, 64 to the vehicle or machine for which the transmission is provided. Such connecting means can take the form of projecting studs, bolt receiving apertures and other suitable conventional devices for attachment. The outer periphery of the rings 62, 64 essentially defines the diameter of the space occupied by the transmission assembly.

Figure 4:
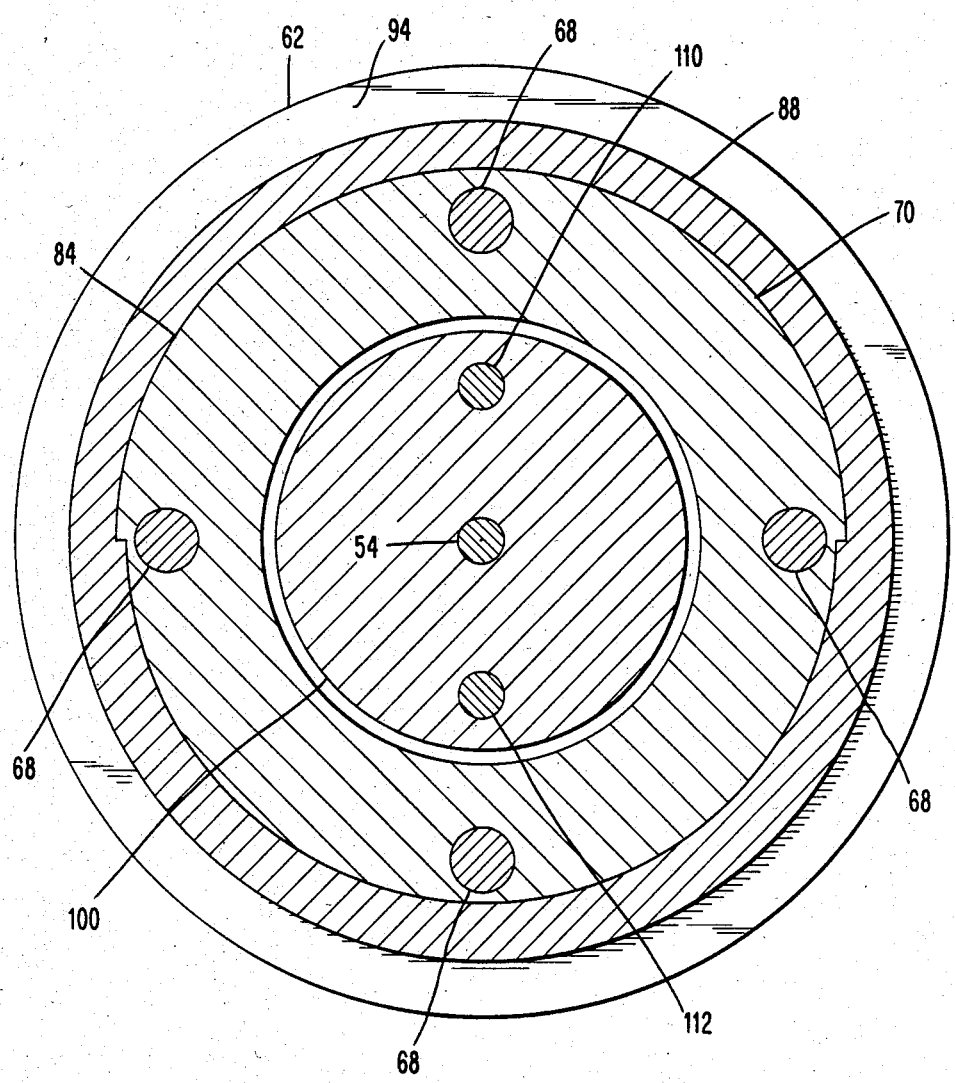
FIG. 4 is a partial cross-sectional view taken along line 4—4 of FIG. 2.

Each ring 62, 64 also includes an inner circumferential surface 66 which defines a circularly cylindrical operating zone within which the input means 52 and the output means 56 may freely operate. In addition, each annular ring 62 is provided with a plurality of lugs or projections 68 which extend axially toward a center plane of the transmission. The lugs 68 (see FIG. 4) may be circularly cylindrical in cross-section. Alternatively, the lugs 68 can be provided with other suitable cross-section. The purpose of the lugs 68 is, however, to prevent relative rotation between the corresponding annular ring 62 (see FIG. 2) and an axially adjustable control ring 70 which regulates the diameter of the envelope in which the band means 58 operates.

Each ring 62, 64 preferably has a axially undercut portion 72 adjacent to the cylindrical surface 66 and facing axially inwardly toward the central plane of the transmission. Each lug 68 preferably extends axially upwardly from the undercut portion 72. The undercut portion 72 permits the axially adjustable control ring 70 to move axially away from the central plane of the transmission and defines a mechanical limit on the adjustability of the controllable ring 70.

The structural means 50 also includes a second axially adjustable controllable ring 74 which is rotationally fixed with respect to the second annular ring 64. The controllable rings 70, 74 are mirror images of one another. Moreover, each of the rings 70, 74 is annular and has a corresponding frustoconical surface 76, 78. These frustoconical surfaces 76, 78 provide a bearing surface upon which edges of the endless metal band means 58 have frictional engagement. In addition, each axially adjustable controllable ring 70, 74 has a plurality of axially oriented recesses 80, 82 which are sized, shaped, and positioned to receive a corresponding lug 68 of the associated fixed ring 62, 64. The combinations of projections 68 and corresponding recesses 80, 82 may be arranged around the circumference of the transmission in any desired fashion. For convenience, it will often be advantageous to dispose these projections and recesses in uniform equiangular spacing circumferentially around the centerline of the transmission.

The radially outermost circumference of each controllable ring 70, 74 is preferably provided with screw threads. These screw threads may be square threads or any other suitable conventional thread shape. However, the threads 84 provided on the radially outermost circumferential surface of the controllable ring 70 are preferably cut with one hand i.e., the helix angle of the threads has a first value; whereas the threads 86 provided on the second axially adjustable controllable ring 74 are cut with the opposite hand, i.e., the helix angle of the threads has a second value which is the same in magnitude but opposite in sign (+ or −) to the first value.

In order to regulate the axial adjustment of the controllable rings 70, 74, the control means 60 preferably includes a rotatable sleeve 88 having an internal cylindrical surface provided with threads 90 of one hand meeting threads 92 of the opposite hand at the central plane. The threads 90 conform to and cooperate with the threads 84 of the first axially adjustable controllable ring 70. Similarly, the threads 92 cooperate with and conform to the threads 86 of the second axially adjustable controllable ring 74. Accordingly, when the sleeve 88 is caused to rotate, it moves the conical surfaces 76, 78 of the controllable rings 70, 74 axially toward one another or axially away from one another, depending upon the direction upon which the sleeve 88 rotates. The sleeve 88 is confined against axial displacement relative to the transmission by the presence of the annular bearing surfaces 94, 96 extending generally radially along each of the annular rings 62, 64. A radially projecting yoke (not shown) securely attached to the sleeve 88 may be provided to position the sleeve 88 with respect to the structural means 50. Alternatively, any other suitable conventional device may be used to rotate the sleeve 88. Moreover, radial limits on the adjustment of the sleeve 88 may be provided by using mechanical stops, such as bolts, extending between the annular rings 62, 64.

It will be noted at this point that while the preferred embodiment of the present invention includes threads of opposite hands to provide axial adjustment for the controllable rings 70, 74, it is within the scope of this invention to provide one ring 74 which is axially fixed while the other one of the controllable rings is axially adjustable. Moreover, it will be apparent that as the axial spacing between the controllable rings 70, 74 varies in response to movement of the sleeve 88, the radial position of a fixed axial length such as the cross section of the endless band means moves radially inwardly or outwardly between the frustoconical surfaces 76, 78 depending upon whether the axial spacing decreases or increases, respectively.

Turning now to the input means 52, a rotationally symmetric input member 100 is rotatably mounted on the shaft 54 extending along the centerline of the transmission. Suitable conventional bearings may be provided, as desired, to mount the rotationally symmetric input member 100. The input member 100 includes means for imparting a constant angular velocity input thereto. As illustrated, this may be a groove 102 having a generally trapezoidal cross section adapted to receive the conformingly shaped drive belt from a constant speed source (not shown).

Other suitable conventional drive mechanisms are also within the scope of this invention and may, for example, be sprocket teeth for cooperation with a chain, gear teeth for cooperation with a driven spur gear, drive belt combinations or the like.

The rotatable input member 100 has a cylindrical surface portion 104 which is disposed radially inwardly with respect to one of the axially adjustable controllable rings 70 and within the operating zone of the ring 62. The axial length of the cylindrical surface 104 is sufficient to permit axial movement of the controllable ring 70 without any mechanical engagement between the controllable ring 70 and the rotatable member 100.

In addition, the rotatable input member 100 includes a pair of axially oriented diametrically opposed bores 106, 108, each of which is shaped to receive and retain a corresponding shaft 110, 112. Each shaft 110, 112 is cantilever mounted in the corresponding bore 106, 108 and is suitably secured thereto so as to be non-rotatable with respect to the member 100. If desired, the shafts 110, 112 may be enlarged at the end which is mounted to the input member 100 in order to provide greater stability for the cantilever mounting. Since the input member 100 rotates about the centerline of the shaft 54, it will be apparent that each of the shafts 110, 112 orbits the centerline of the shaft 54 through a circular path. Moreover, each of the shafts 110, 112 orbits the centerline of the shaft 54 once each time the input member 100 completes a revolution.

The output means 56 for providing the variable angular velocity output from the transmission through zero and into reverse includes an output gear 120 that is rotatably mounted on the central shaft 54. This output gear 120 may be provided with a suitable conventional bearings 122, as desired. Moreover, the output gear 120 may be attached to a pulley, gear, sprocket or the like (not shown) in order to provide a means for utilizing the variable output speed. The output gear 120 is generally radially inwardly disposed with respect to the structural means 50 and the ring 64. Moreover, the output gear 120 has an axially extending cylindrical surface 124 that is radially inwardly disposed with respect to the second controllable ring 74 and within the operating zone defined thereby. The axial length of the cylindrical surface 124 is selected such that there is no mechanical engagement between the controllable ring 74 and the output gear 120 during the permissible axial movements of the controllable ring 74. In addition, the output gear 120 is provided with an internal ring gears 126 (see FIG. 5), the teeth of which cooperate with a pair of pinions 128, 130.

The pinion 128 is rotatably mounted on the orbiting shaft 110; whereas the pinion 130 is rotatably mounted on the corresponding orbiting shaft 112 (see FIG. 2) of the input member 100. In addition, the pinion 128 is coaxially aligned with and rigidly attached to a roller 132 that is also rotatably mounted on the shaft 110. In similar fashion, the pinion 130 is rigidly attached to a corresponding coaxially aligned roller 134 rotatably mounted on the other orbiting shaft 112. Suitable conventional bearings may be provided, as desired, to permit the rotational movement of each pinion and roller assembly with respect to the corresponding orbiting shaft. The rollers 132, 134, the pinions 128, 130 and the output gear 120 cooperate to define the output means 56.

The transmission further includes an idling roller 136 which is rotatably mounted on the shaft 54 between the input member 100 and the output gear 120. Moreover, the idling roller 136 lies in the radial alignment with the endless metal band means 58 and the rollers 132, 134. In fact the axial length of the rollers 132, 134, the axial length of the idling roller 136 and the axial length of the endless metal band means 58 are substantially the same, and are preferably identical.

Figure 3:
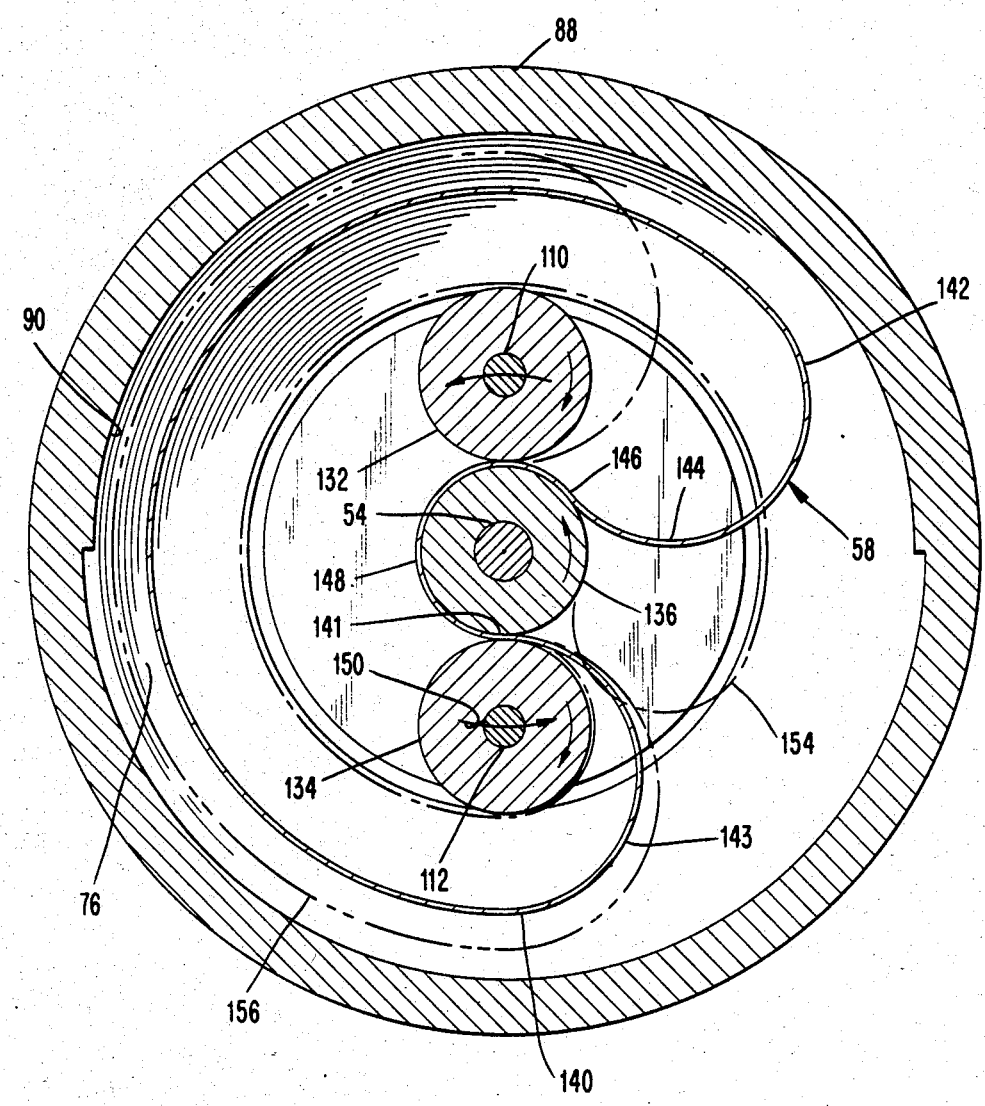
FIG. 3 is a partial cross-sectional view taken along the line 3—3 of FIG. 2.

Turning now to FIG. 3, the manner in which the endless metal band means 58 cooperates with the input means 52, the output means 56 and the structural means 50 is most clearly illustrated. In this connection, a circularly arcuate portion of the endless metal band means 58 engages the conical surface 76 of the controllable ring along a substantial portion of the length of the band means. This length of circularly arcuate contact extends between a first tangency point 140 and a second tangency point 142. The endless metal band means 58 also has a second portion which is not in contact with the frustoconical surfaces 76 and which also extends between the points of tangency 140, 142. Throughout this portion of its lengths, the endless metal band means 58 defines a first lobe 143 that extends from the first point of tangency 140 to a first point of inflection 141. The first point of inflection 141 is generally disposed at the nip between the roller 134 and the idling roller 136.

In addition, the endless metal band means 58 includes a second lobe 144 which extends from the second point of tangency 142 to a second point of inflection 146 which is ordinarily located along the cylindrical surface of the idling roller 136. Extending between the points of inflection 141, 146, the endless metal band means 58 includes a reflexively curved portion 148 which is in non-slipping contact with the cylindrical surface of the idling roller 136.

In addition to the features of the endless metal band 58 described above, the endless metal band means 58 is fashioned so that it has generally parallel edges with an essentially constant axial length. The thickness of the metal band means 58 is highly uniform so that the bending properties of the band is essentially uniform throughout its length. Moreover, the length of the endless metal band 58 is preferably selected so that it conforms to the circumferential length of a predetermined circular line (a) lying on the conical surface 76 between the radial limits thereof and (b) concentric with the axis of the shaft 54. In this manner, the transmission will have one operating condition where the band means 58 does not rotate relative to the frustoconical surfaces 76. Moreover, for operating conditions where the band is radially inward of this circular line, the band means 58 moves in one circumferential direction, whereas when the band means 58 is radially outward of this circular line, the band means 58 moves in the opposite circumferential direction.

The idling roller 136 has pure rolling contact with the outer surface of the band means 58 which loops therearound. The rollers 132, 134 each are located in a corresponding lobe 144, 143 of the band means 58 and have pure rolling contact with the inside surface of the band means 58. In addition, the band means 58 passes through the nip defined between the roller 134 and the idling roller 136 as well as through the nip between the roller 132 and the idling roller 136. The diametrically opposed arrangement of the rollers 132, 134 with respect to the idling roller 136 provides balanced forces thereon and essentially constrains the reflexively curved portion 148 of the band means to a circular shape.

In some applications, it is desirable to transmit more torque than is possible with the speed changing device described above. For those applications, a simple modification of the previously described structure will provide the desired result. More particularly, the endless metal band means 58 can be used in the form of any integral number of individual endless bands which are nested with respect to each other. For example, four bands 170, 172, 174, 176 (see FIG. 6) are radially nested with respect to one another. All of the four bands have the same axial width, radial thickness, and circumferential length.

Generally, the bands are in surface contact with one another throughout their entire length except for that portion in the second lobe where separation occurs between the bands. This separation accommodates different circumferential displacements of the bands due to their operating radii.

Figure 7:
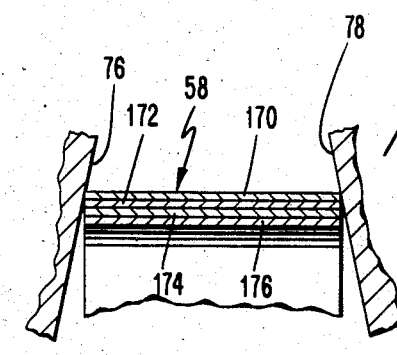
FIG. 7 is an enlarged partial cross-sectional view taken along the line 7—7 of FIG. 6.

The radially outermost band 170 has edges which engage the corresponding frustoconical surfaces 76, 78 (see FIG. 7). Edges of the inner bands 172, 174, 176 preferably do not touch those frustoconical surfaces. As the band thickness is selected for acceptable fatigue endurance, band thickness itself cannot be simply increased to improve stiffness of the band means 58. However, by using multiple bands, the stiffness of the band means 58 is increased in direct proportion to the number of bands employed.

Figure 6:
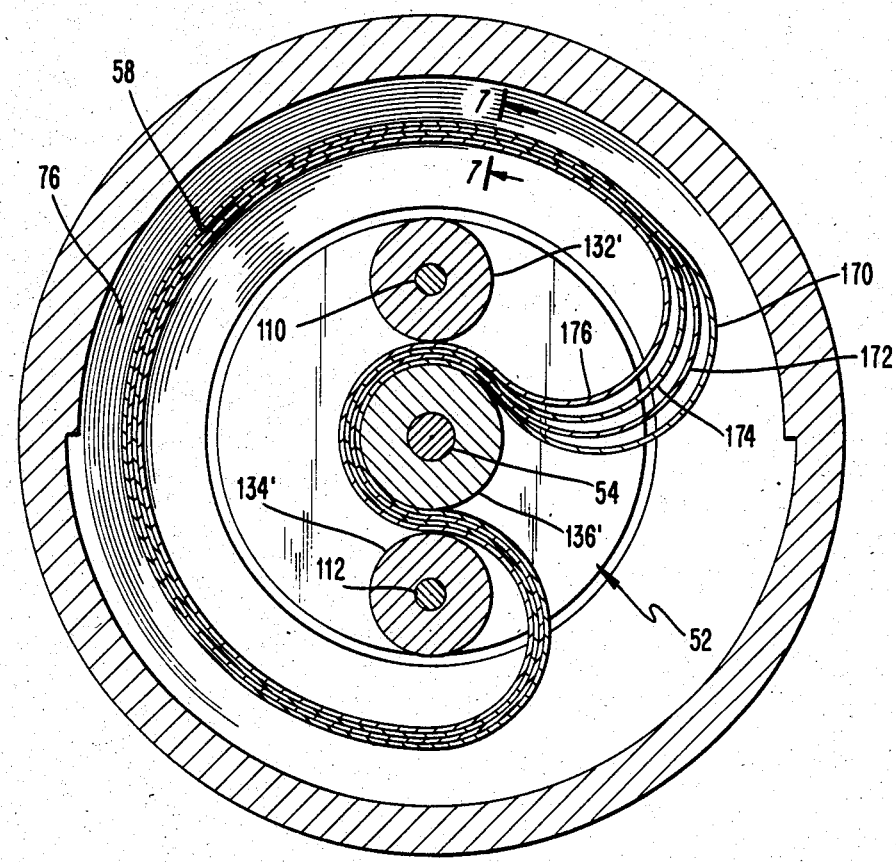
FIG. 6 is a partial cross-sectional view of a second embodiment.

As depicted in FIG. 6, the orbiting rollers 132', 134' have diameters which are equal yet smaller than the diameter of the idling roller 136'. This diameter relationship is also possible with the first embodiment. Moreover, the diameters of the rollers 132', 134', 136' could all be equal, as illustrated in the first embodiment.

The multiple band embodiment provides an additional advantage: it eliminates the potential cessation of operability that can occur if the band means 58 should break. More particularly, if one of the four bands should break, the other three are available to continue doing the work expected from the band means.

While the nested bands 170, 172, 174, 176 may have the same axial length as described above, the axial legnths may be different. One interesting arrangement would be where the axial length of each band varies relative to the adjacent bands such that the edges of each band engage the frustoconical surfaces 76, 78 simultaneously.

OPERATION

The operation of the transmission or speed changing device of the present invention will now be described in detail.

With reference to FIG. 2, a V-belt or other device cooperates with the groove 102 of the rotary input member 100 in the input means 52 to supply a generally constant angular velocity to the input means 52. As the rotary input member 100 rotates about the shaft 54, it causes the shafts 110, 112 to orbit around the centerline of the shaft 54. As the shafts 110, 112 orbit about the centerline of the shaft 54 (see FIG. 3) in the direction of the arrow 150, the roller 132 and the roller 134 likewise orbit.

The roller 134 will hereafter be referred to as the "driven roller" and the roller 132 will hereafter be referred to as the "reaction roller". The driven roller 134 is caused to rotate as the supporting shaft 112 orbits while the roller surface is in rolling contact with the first lobe 142 of the endless metal band means 58.

As the orbiting roller 134 moves circumferentially around the idling roller 136, the first and second lobes 142, 143 of the endless metal band means 58 also move circumferentially around the transmission. During this movement of the lobes, the portions of the endless metal band means 58 between the points of tangency 140, 142 are picked up radially, are caused to move circumferentially around the surface of the idling roller 136 with a constant tangential velocity, and are ultimately placed radially outwardly into non-slipping contact with the conical surfaces of the controllable ring members. The angular velocity of the idling roller 136 therefore corresponds to the velocity and direction of the reflexively curved portion 148 of the endless metal band means 58.

Since the orbiting drive roller 134 and the reaction roller 132 each have the same diameter and each orbit about the same circular path around the center of the shaft 54, and since the surface of both rollers 134, 132 is in non-slipping rolling contact with the same inside surface of the endless metal band means 58, both the driven orbiting roller 134 and the reaction roller 132 have identical angular velocities.

Now then, since the orbiting roller 134 (see FIG. 2) carries the pinion 130 and the reaction roller 132 carries the pinion 128, the angular velocity of the two rollers 132, 134 is the same as the angular velocity of the pinions 128, 130.

Again, since the pinions 128, 130 (see FIG. 5) are rotatably mounted about centers which are exactly the same distance from the center of the shaft 54, the teeth of the pinions 128, 130 have the same surface velocities. Accordingly, meshed engagement between the pinions 128, 130 and the internal ring gear 126 of the output gear 120 causes angular velocity of the output gear 120 in the direction shown by the arrow 152. The ratio between the number of teeth on each pinions 128, 130 and the number of teeth on the internal ring gear 126 determines the relationship between the angular velocity of the pinions 128, 130 and the output gear 120.

Now then, during a complete orbit of the shafts 112, 110 (see FIG. 3) about the centerline of the shaft 54, there will also be an orbit of the first and second lobes 143, 144 about the centerline of the shaft 54 also. A point located at the first point of tangency 140 will be displaced during each orbit of the orbiting shaft 112 by a distance X which is equal to $X = L - \pi D i$ where L is the length of the band means 58, and Di is the diameter of the circularly arcuate portion of the band means 58 between the points of tangencies 140, 142. This result follows from the analogy to the illustration of FIG. 1.

Moreover, since the idling roller 136 has a surface which contacts the entire portion of the length of the band means 58 during one orbit of the shaft 112, the angular velocity $W_{136}$ of the idling roller 136 is related to the input angular velocity $W_{in}$ as follows:

$$W_{136} = \frac{L^*}{\pi D_{136}} W_{in}$$

where L* is the length of the band means 58 which passes along its surface during one orbit to the circumferential length of the surface of the idling roller 136. Accordingly, the angular velocity of the idling roller 136 can be expressed as:

$$W_{136} = \frac{L-X}{\pi D_{136}} W_{in}$$

since $L^* = L - X$.

Since X can also be expressed in terms of (a) the band length, L, and (b) the diameter, Di, of the circularly arcuate portion of the band means 58 as shown above, the angular velocity of the idling roller 136 can be simplified to:

$$W_{136} = \frac{Di}{D_{136}} W_{in}$$

Note that $W_{in}$ is also the angular velocity at which the shaft 112 orbits the centerline of the shaft 54. The angular velocity $W_{132}$ of the orbiting roller 134 and of the reaction roller 132 can be expressed as:

$$W_{132} = \frac{R_{132} + t/2}{R_{136} + t/2} W_{136}$$

where $W_{136}$ is the angular velocity of the idling roller 136; $R_{132}$ is the radius of the reaction roller 132; $R_{136}$ is the radius of the idling roller 136; and t is the thickness of the band means 58.

Figure 5:
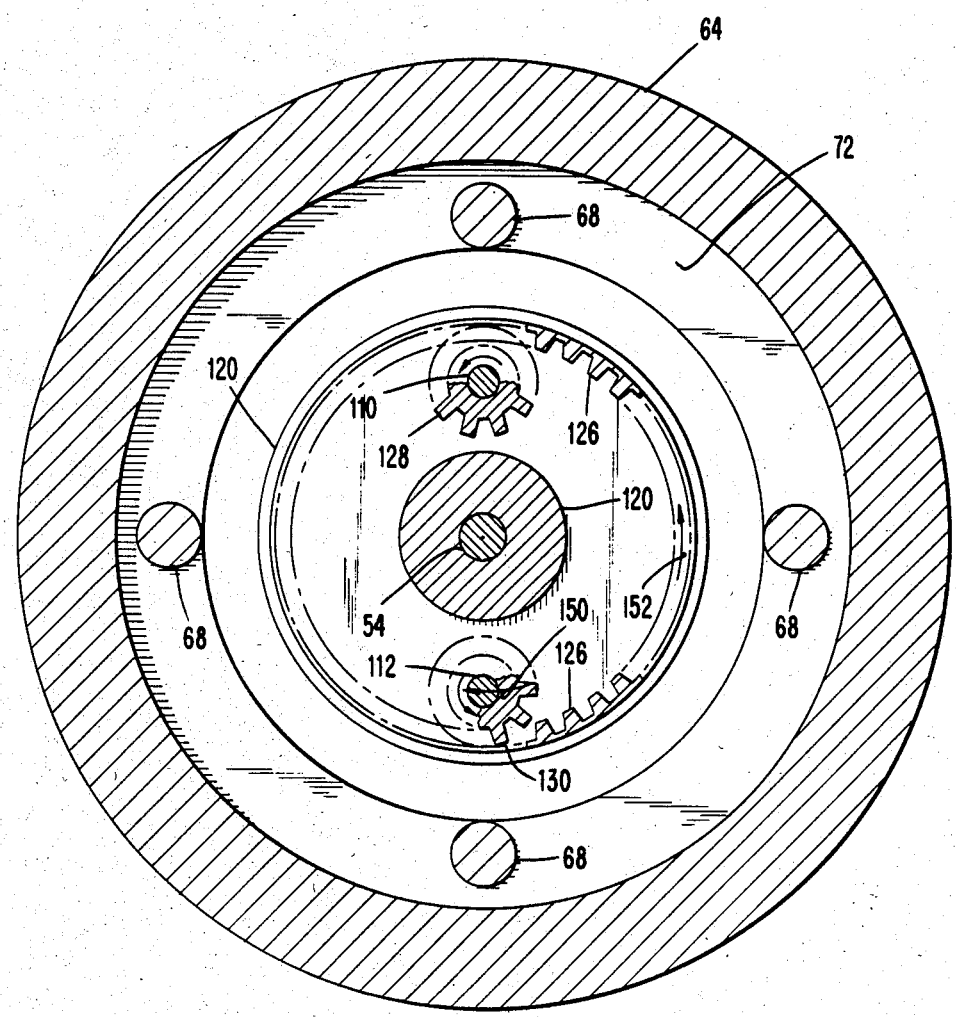
FIG. 5 is a partial cross-sectional view taken along line 5—5 of FIG. 2.

To evaluate the ratio between the output speed and the input speed for the transmission, there are a few relationships which need to be considered and understood. For example, as shown in FIG. 5, the output speed $W_{out}$ corresponds to the angular velocity $W_{126}$ of the internal ring gear 126 in the direction of the arrow 152. The ratio of the angular velocity of the output gear 120 with respect to the pinion 130, 128 is of course fixed by the number of teeth in the respective gears. However, the relative rotation of the pinion 130 on its orbiting shaft 150 determines how much the output angular velocity will be. In order to evaluate the rotation of the pinion 130 as it orbits, it will be recalled that the pinion 130 is integrally connected to the orbiting roller 134 and therefore has a corresponding angular velocity. Moreover, since the angular velocity of the orbiting roller 134 corresponds to the surface speed of the metal band means 58 passing between the orbiting roller 134 and the idling roller 136, the following relationship exists:

$$\frac{D_{132} + \frac{t}{2}}{D_{136} + \frac{t}{2}} = \frac{W_{136}}{W_{132}}$$

where $D_{132}$ is the diameter of the orbiting roller 132; $D_{136}$ is the diameter of the roller 136; t is the thickness of the band means 58; $W_{132}$ is the angular velocity of the roller 132; $W_{136}$ is the angular velocity of the idling roller 136.

When all these relationships are properly expressed, it can be shown that the ratio of the output angular velocity, $W_{out}$, to the input angular velocity, $W_{in}$, is expressed as follows:

$$\frac{W_{out}}{W_{in}} = \frac{R_{112}}{R_{126}} \cdot \frac{N_{t130}}{N_t} \cdot \frac{R_{136} + t/2}{R_{132} + t/2} \cdot \frac{\frac{L}{2\pi} - R_i}{(R_{136} + t/2)}$$

wherein $R_{112}$ is the radius about which the shaft 112 orbits; $R_{126}$ is the effective radius of the internal ring gear; and $N_{t130}$ is the number of teeth in the output pinion 130; $N_{t126}$ is the number of teeth in the internal ring gear (see FIG. 5); $R_{136}$ is the radius of the idling roller; t is the thickness of the band means 58; $R_{132}$ is the radius of the orbiting roller; and $R_i$ is the radius of the circularly arcuate portion of the band means 58 which engages the converging frustoconical surfaces 76.

From the foregoing relationship, it will be apparent that there is a value for the radius of the circularly arcuate portion of the metal band means 58 for which the output angular velocity is zero. Moreover, it will be seen that for values of the radius of that circular portion of the band means which exceed that predetermined value, the output speed is negative, meaning that the output angular velocity is in reverse. And, for values of that radius which are less than the predetermined value, the output angular velocity will be in the same direction as the input angular velocity. Furthermore, the output angular velocity will increase as the radius of the circularly arcuate portion of the band means 58 decreases. Conversely, the output angular velocity of the transmission will decrease as the radius of the circularly arcuate portion of the band increases.

Turning now to FIG. 2, it can be appreciated that while the input means 52 is rotating, when the sleeve 88 is given a rotation causing the frustoconical surfaces 76, 78 to move axially toward one another, the circularly arcuate portion of the band means 58 which engages those frustoconical surfaces moves radially inwardly. Accordingly, this rotational movement of the sleeve 88 causes the output gear 120 to increase in speed. It will be, moreover, apparent to those skilled in the art that the inclination of the frustoconical surfaces 76, 78 determines the rate of change of speed of the output gear 120. More particularly, it can be seen from the relationship given above that for each one degree change in the angular position of the sleeve 88, a corresponding axial movement of the frustoconical surfaces 76, 78 toward one another can occur. (For the sake of this discussion, it will be assumed that the movement of the sleeve 88 causes the frustoconical surfaces 76, 78 to move toward one another.) For each incremental displacement of the frustoconical surfaces 76, 78 toward one another, there is a corresponding radially inward movement for the circularly arcuate portion of the band means 58. The relationship between the axial reduction in the spacing between the frustoconical surfaces 76, 78 and the change in radius of the circularly arcuate portion of the band means 58 is controlled by the cone angle of the frustoconical surfaces 76, 78: the greater the cone angle the more rapid the increase in output speed for a given angular displacement of the sleeve 88.

It will be appreciated by those skilled in the art that opposite rotation of the sleeve 88 will cause the frustoconical surfaces 76, 78 to move axially farther apart permitting the radius of the circularly arcuate portion of the band means 58 to increase thereby decelerating the output gear to a full stop at zero angular velocity or to move into reverse.

There are of course physical constraints which limit the permissible excursions of the circularly arcuate portions of the band means 58 in the radial direction (see FIG. 3). For example, as illustrated, the highest speed and radially innermost position of the band means 58 is illustrated in broken lines and designated by the reference numeral 154. This position of the band means provides a physical constraint since the first and second lobes 143, 144 come into rubbing contact at this innermost radial position. The outermost radial position is also illustrated in a broken line and provided with a reference numeral 156. The outermost radial position corresponds to that location where the band means 58 has a second point of tangency 142 which is diametrically opposed to the first point of tangency 140.

Having described the working interrelationships between the various elements of this transmission, it will now be apparent that as the input means rotates and the shafts 110, 112 orbit, the reaction roller 132 and the idling roller 136 cooperate to pick up the second lobe 144 of the band means and cause the second point of tangency 142 to move circumferentially in the counterclockwise direction as shown in FIG. 3. Moreover, the idling roller 132 pays out the band means 58 at a corresponding velocity such that it lays down against the opposed conical faces at the first point of tangency 140 which also circumferentially moves around the transmission. As the radius of the circularly arcuate portion of the band means 58 changes, the angular velocity of the driven orbiting roller 134 and the pick-up roller 132 have corresponding sensitive speed changes.

The operation of the multi-element band means 58 (FIG. 6) is the same as that described above in connection with the first embodiment.

While the input, output, and stationary elements of this speed changing device have been described above in the preferred embodiment which represents the best mode of practicing this invention presently known, it is conceivable that applications may exist where the functions of the elements designated as input, output and stationary are reversed or permutated. Such permutated or reversed operations are intended to be within the scope of this invention.

It will now be apparent to those skilled in the art that a transmission constructed in accordance with the present invention provides numerous advantages over those heretofore available. For example, the transmission is infinitely variable between a forward speed and a reverse speed through zero. In addition, the transmission relies upon non-sliding frictional engagement between the band means 58 and the frustoconical surfaces 76, 78 while the band has pure rolling contact with the orbiting roller 134 and the reaction roller 132, as well as with the idling roller 136.

To the extent that wear on the edges of the metal band means 58 occurs or to the extent that wear in the frustoconical surfaces 76, 78 occurs, the transmission is self-adjusting. More particularly, in order to compensate for the wear, one simply increases the angular adjustment of the sleeve 88.

Moreover, the elements of the transmission require essentially no lubrication.

Still further, the package within which the transmission is contained has a thickness which is one-half to one-third its principal dimension providing a highly compact power transmitting device.

It should now be apparent to those skilled in the art that there has been provided in accordance with the present invention a transmission which overcomes the problems of the type discussed above and provides significant advantages over the heretofore existing prior art. Moreover, it will be apparent to those skilled in the art that many modifications, variations, substitutions, and equivalents exist for features of the invention which do not materially depart from the spirit and the scope thereof. Accordingly, it is expressly intended that all such modifications, variations, substitutions and equivalents which exist for features of the present invention as defined by the appended claims be embraced thereby.

What is claimed is:

1. A transmission for generating an infinitely variable speed output from a constant speed input comprising:
   a rotationally fixed structural means for mounting the transmission;
   input means for delivering a generally constant speed input to the transmission;
   output means for extracting a variable speed output from the transmission, a portion of the output means being carried by a portion of the input means;
   endless metal band means having a reflexively curved portion, a circumferential portion engaging the structural means and a lobe circumferentially moveable by the input means, and being operable to determine the variable output speed; and
   control means carried by the structural means and operable to regulate the endless metal band means.

2. The transmission of claim 1 wherein:
   the structural means includes a center and a pair of surfaces engaged by the metal band means and inclined so as to be convergent in a direction radially outward from the center; and the control means is operable to regulate axial spacing between the inclined surfaces.

3. The transmission of claim 2 wherein:
   the pair of inclined surfaces are essentially continuous in the circumferential direction and define generally frustoconical surfaces; and
   the endless band means has a pair of generally parallel edges, each edge being in partial engagement with a corresponding one of the inclined surfaces.

4. The transmission of claim 1 wherein the output means is continuously operable from forward speeds through zero to reverse speeds.

5. The transmission of claim 1 wherein the control means includes a threaded ring having threads of one hand at one end and threads of the opposite hand at the opposite end and wherein the structural means includes portions engaged by the ring and having correspondingly threaded portions, so that rotation of the ring moves the structural portions axially relative to one another to effect control of the band means.

6. A transmission for generating an infinitely variable speed output from a constant speed input comprising:
   a rotationally fixed structural means for mounting the transmission;
   input means for delivering a generally constant speed input to the transmission;
   output means for extracting a variable speed output from the transmission;
   endless metal band means engaging the structural means, engaged by the input means, and operable to determine the variable output speed;
   control means carried by the structural means and operable to regulate the endless metal band means;
   wherein the input means includes a central shaft coaxially mounted with a centerline of the transmission and an orbiting shaft mounted generally parallel to the central shaft but radially spaced therefrom;
   wherein the output means includes a central roller rotatably mounted on the central shaft and an orbiting roller rotatably mounted on the orbiting shaft; and
   wherein the endless metal band means partially wraps the central roller, and is pinched between the central roller and the orbiting roller such that the band means causes the central roller and the orbiting roller to rotate as the orbiting shaft is driven.

7. The transmission of claim 6 wherein:
the input means further includes a second orbiting shaft radially opposed from the first orbiting shaft; and
the output means includes a second orbiting roller rotatably mounted on the second orbiting shaft such that the band means is pinched between the second orbiting roller and the central roller and such that opposing radial forces on the central roller are reacted.

8. The transmission of claim 6 wherein the output means includes means for converting rotational movement of the orbiting roller into the output speed.

9. The transmission of claim 8 wherein the converting means includes a gear coaxially connected to the orbiting roller and a cooperating gear carried by the output shaft.

10. The transmission of claim 7 wherein:
each orbiting roller carries a coaxial planetary gear; and
an internal ring gear meshes with the planetary gears and is driven thereby.

11. The transmission of claim 10 wherein the gear ratio is selected such that the output speed includes a nonrotating value.

12. A method of changing rotational speed comprising the steps of:
constraining an endless metal band having a predetermined length in an envelope having a circumference less than the predetermined length such that a lobe and a reflexively curved portion are displaced from the envelope;
restraining an arcuate portion of the endless metal band from movement relative to the operating envelope;
applying an input torque to the lobe of the endless metal band with an orbiting support carrying a rotatable element;
driving the rotatable element by frictional engagement with the endless metal band; and
extracting power from the rotatable element.

13. The power transmitting method of claim 12 wherein:
the restraining step includes frictionally engaging generally parallel side edges of the arcuate portion of the endless metal band.

14. The power transmitting method of claim 12 wherein constraining step includes looping the endless metal band around a centrally disposed rotatable element such that a reflexive curvature occurs between the two rotatable elements and the centrally disposed rotatable element guides the endless metal band to the orbiting rotatable element.

15. The power transmitting method of claim 12 further including the step of changing the circumference of the envelope to change the power extracted.

16. A speed changing device comprising:
a generally cylindrical rotationally fixed envelope having a circumferential length;
band means disposed in the envelope for partial engagement therewith and having a length which exceeds the circumferential length such that the band means defines an arcuate portion engaging the envelope, a lobe, and a reflexively curved portion, the arcuate portion having a length which is substantial in relation to the circumferential length of the envelope;
input means operable to move the lobe circumferentially around the envelope so that the band means moves at least radially with respect to the envelope; and
output means driven by the moving lobe for providing an output speed.

17. The power transmitting device of claim 16 further including means for adjusting the circumferential displacement of a point on the band with respect to the envelope during each revolution of the lobe can be controlled so as to change the output speed.

18. The power transmitting device of claim 16 wherein the band means includes two endless metal bands nested radially.

* * * * *